United States Patent
Terry

(10) Patent No.: US 11,679,401 B2
(45) Date of Patent: Jun. 20, 2023

(54) REUSABLE CONTAINER SYSTEM AND METHOD THAT REDUCES THE USE OF PLASTIC

(71) Applicant: Briotech, Inc., Woodinville, WA (US)

(72) Inventor: Daniel James Terry, Mill Creek, WA (US)

(73) Assignee: Briotech, Inc., Woodinville, WA (US)

( * ) Notice: Subject to any disclaimer, the term of this patent is extended or adjusted under 35 U.S.C. 154(b) by 0 days.

(21) Appl. No.: 17/343,642

(22) Filed: Jun. 9, 2021

(65) Prior Publication Data
US 2021/0379614 A1 Dec. 9, 2021

Related U.S. Application Data

(60) Provisional application No. 63/036,723, filed on Jun. 9, 2020.

(51) Int. Cl.
*B05B 11/00* (2023.01)
*B05B 11/02* (2023.01)

(52) U.S. Cl.
CPC ........ *B05B 11/026* (2023.01); *B05B 11/0054* (2013.01); *B05B 11/0089* (2013.01)

(58) Field of Classification Search
CPC .......... B05B 11/00412; B05B 11/0054; B05B 11/0089; B05B 11/3047; B29C 65/02; B65B 51/227; B65B 3/06; B65B 51/303; B65B 2220/18
See application file for complete search history.

(56) References Cited

U.S. PATENT DOCUMENTS

| | | | | |
|---|---|---|---|---|
| 2,564,400 A | * | 8/1951 | Hall | A61M 15/0025 128/202.16 |
| 4,469,250 A | * | 9/1984 | Evezich | B65D 83/0055 222/83.5 |
| 4,601,410 A | * | 7/1986 | Bond | B65D 75/5877 493/929 |
| 9,296,551 B2 | * | 3/2016 | Klein | B65D 83/72 |
| 2013/0240566 A1 | * | 9/2013 | Randolph-Colon | A45D 26/0014 222/215 |
| 2021/0309398 A1 | * | 10/2021 | Kircher | B29C 66/942 |

* cited by examiner

*Primary Examiner* — Donnell A Long
(74) *Attorney, Agent, or Firm* — Seed Intellectual Property Law Group LLP

(57) ABSTRACT

A reusable container system and method for reducing the use of plastic is disclosed herein. In one embodiment, a reusable container includes: a reusable bottle; a lid attachable to the reusable bottle that enables access removing and inserting single-use replaceable sealed bag or pouch; an inner single-use replaceable sealed bag or pouch that holds a liquid, viscous, or gel material inside the reusable bottle; a sprayer or pump attachable to the reusable bottle; and a dip tube with a leading edge that pierces the inner bag upon assembly of the above listed components. The liquid material is accessed for dispensing through the dip tube without contaminating the reusable bottle.

20 Claims, 6 Drawing Sheets

REUSABLE CONTAINER SYSTEM AND METHOD THAT REDUCES THE USE OF PLASTIC

BACKGROUND

Technical Field

The present disclosure relates generally to a system and method for a reusable container for dispensing liquids, and more specifically to a system and method a for reusable container for dispensing liquids that reduces the use of plastic.

Description of the Related Art

Consumer plastic packaging is extremely wasteful and impacts earth's water and food ecosystems with its functional near permanence. All but 9% of the 9.2 billion tons of plastic waste that has been produced end up in landfills or are disposed of into the environment and eventually break down into microplastics that are found in the entirety of our oceans and food chain with raw plastic waste found from the Marianas Trench to the tops of our mountains. Current projections put plastic production at fourfold increases by 2050. Solutions in reduction of plastic use are desperately needed.

In developed countries, the cost-of-goods of many consumables is disproportionately weighted by the cost of the packaging and the cost of supply chain management and freight. It is common that the direct costs to manufacture a hair product, a consumer drink, a pharmaceutical, or medical topical products are a minor percent of the actual compiled hard costs of the delivered product to an end user. For example, a consumer product might in a first-world cost $35 retail by virtue of its burdened cost of goods, packaging costs, associated freight, and multiple mark ups to the end user of which over 90% may not be product related.

Therefore, systems and methods are needed for low cost, reusable containers that are sanitary, and reduce the use of plastic.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Briefly, in some embodiments of the inventive technology, an exterior container or bottle is produced in such a manner so as to be "lifetime" reusable. An inner carrier for the liquid or viscous materials in the bottle may be formed from thin plastic roll-tubing that is heat-sealed to include the liquid or gel product. Sealed product can be placed into the reusable container. A non-limiting example of such sealed product is a quantity of liquid sealed in a plastic bag. When the product is used up, only the sealed bag is replaced, therefore achieving significant cost savings and reduction in global single-use plastics waste. In some embodiments, up to 99% cost savings may be realized in comparison with conventional packaging technology.

Briefly stated, in some embodiments of the reusable container system, the reusable container system includes: a reusable bottle, a shoulder-located lid, a single-use sealed replaceable inner bag, an actuating expeller device, and a dip tube. In one or more embodiments, the reusable bottle has a bottom floor, side walls, and an opening at a top of the sidewalls, wherein the opening has a width that is approximately a same width as a width of the inside of the side walls. In another aspect, the shoulder-located lid is attachable to the reusable bottle at the opening at the top of the sidewalls. In still another aspect, the single-use sealed replaceable inner bag holds a liquid material inside the reusable bottle. In yet another aspect, the actuating expeller device is operatively associated with the lid of the reusable bottle. In another aspect, the dip tube has a leading edge that pierces the single-use sealed replaceable inner bag upon assembly, accesses the liquid material, and dispenses the liquid material without contaminating the reusable bottle.

In other embodiments of the reusable container system, the lid is attachable to the reusable bottle by threads, a hinge and one or more clips, a hinge and one or more latches, a hinge and one or more snaps, and a hinge and one or more pressure fitting components. In another aspect of some embodiments, the reusable bottle includes side wall sections that are attached vertically but unattached horizontally, and wherein the side wall sections may be flexed inwards on opposing sides to secure the inner bag and hold the inner bag upright. In still another aspect of some embodiments, the bottom floor is concave in shape with a lowest point at a center of the bottom floor to facilitate consumption of contents of the inner bag. In yet another aspect of some embodiments, the inner bag is manufactured from roll-tubing that is heat-sealed.

In other aspects of the reusable container system, the inner bag is marked with a unique identifier to indicate authentication of manufacturing source. In another aspect of some embodiments, the unique identifier is a custom hologram. In still another aspect of some embodiments, the liquid material is a free flowing substance with a fixed volume that includes gels and viscous materials. In yet another aspect of some embodiments, the actuating expeller device is selected from one or more of a sprayer, a pump, and a plunger.

In one or more other embodiments of the reusable container system, the reusable container system includes: a reusable bottle, a lid, a single-use sealed replaceable inner bag, an actuating expeller device, and a dip tube. In some such embodiments, the reusable bottle has a bottom floor, side walls, and an opening at a top of the sidewalls. In another aspect, the lid is attachable to the reusable bottle at the opening at the top of the sidewalls. In still another aspect, the single-use sealed replaceable inner bag holds a liquid material inside the reusable bottle. In yet another aspect, the actuating expeller device is operatively connectable with the lid of the reusable bottle. In another aspect, the dip tube with a leading edge that pierces the single-use sealed replaceable inner bag upon assembly and accesses the liquid material.

In other embodiments of the reusable container system, the lid is attachable to the reusable bottle by threads, a hinge and one or more clips, a hinge and one or more latches, a hinge and one or more snaps, and a hinge and one or more pressure fitting components. In another aspect of some embodiments, the reusable bottle includes side wall sections that are attached vertically but unattached horizontally, and wherein the side wall sections may be flexed inwards on opposing sides to secure the inner bag and hold the inner bag upright. In still another aspect of some embodiments, the bottom floor is concave in shape with a lowest point at a center of the bottom floor to facilitate consumption of contents of the inner bag. In yet another aspect of some embodiments, the inner bag is manufactured from roll-tubing that is heat-sealed.

In other aspects of the reusable container system, the inner bag is marked with a unique identifier to indicate authentication of manufacturing source. In another aspect of some embodiments, the unique identifier is a custom hologram. In still another aspect of some embodiments, the liquid material is a free flowing substance with a fixed volume that includes gels and viscous materials. In yet another aspect of some embodiments, the actuating expeller device is selected from one or more of a sprayer, a pump, and a plunger. In another aspect of some embodiments, the opening has a width that is within twenty percent of the width of the inside of the side walls.

In some embodiments of a reusable container method of using a reusable container system, the system including a reusable bottle having a bottom floor, side walls, and an opening at a top of the sidewalls, a lid attachable to the reusable bottle at the opening at the top of the sidewalls, a single-use sealed replaceable inner bag that holds a liquid material inside the reusable bottle, an actuating expeller device that is operatively connectable with the lid of the reusable bottle, and a dip tube with a leading edge that pierces the single-use sealed replaceable inner bag upon assembly and accesses the liquid material. The method includes: inserting a single-use sealed replaceable inner bag into the reusable bottle through the opening at a top of the sidewalls; closing the lid attached to the reusable bottle at the opening at the top of the sidewalls; piercing the single-use sealed replaceable inner bag located inside the reusable bottle with the dip tube; using the actuating expeller device to dispense at least a portion of the liquid material out of the single-use sealed replaceable inner bag via the dip tube; removing the single-use sealed replaceable inner bag from the reusable bottle after at least a portion of the liquid material out of the single-use sealed replaceable inner bag has been dispensed; and replacing a new single-use sealed replaceable inner bag into the reusable bottle.

DESCRIPTION OF THE DRAWINGS

The present disclosure will be more fully understood by reference to the following figures, which are for illustrative purposes only. These non-limiting and non-exhaustive embodiments are described with reference to the following drawings, wherein like labels refer to like parts throughout the various views unless otherwise specified. The sizes and relative positions of elements in the drawings are not necessarily drawn to scale in some figures. For example, the shapes of various elements are selected, enlarged, and positioned to improve drawing legibility. In other figures, the sizes and relative positions of elements in the drawings are exactly to scale. The particular shapes of the elements as drawn may have been selected for ease of recognition in the drawings. The figures do not describe every aspect of the teachings disclosed herein and do not limit the scope of the claims.

DETAILED DESCRIPTION

Persons of ordinary skill in the art will understand that the present disclosure is illustrative only and not in any way limiting. Other implementations and various combinations of the presently disclosed system and method readily suggest themselves to such skilled persons having the assistance of this disclosure.

Each of the features and teachings disclosed herein can be utilized separately or in conjunction with other features and teachings to provide a reusable container system and method. Representative examples utilizing many of these additional features and teachings, both separately and in combination, are described in further detail with reference to attached FIGS. 1A-4. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Moreover, the various features of the representative examples and the dependent claims may be combined in ways that are not specifically and explicitly enumerated in order to provide additional useful implementations of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples. Additionally, the headings and Abstract provided herein are for convenience only and do not limit the scope or meaning of the implementations.

Figure 1A:
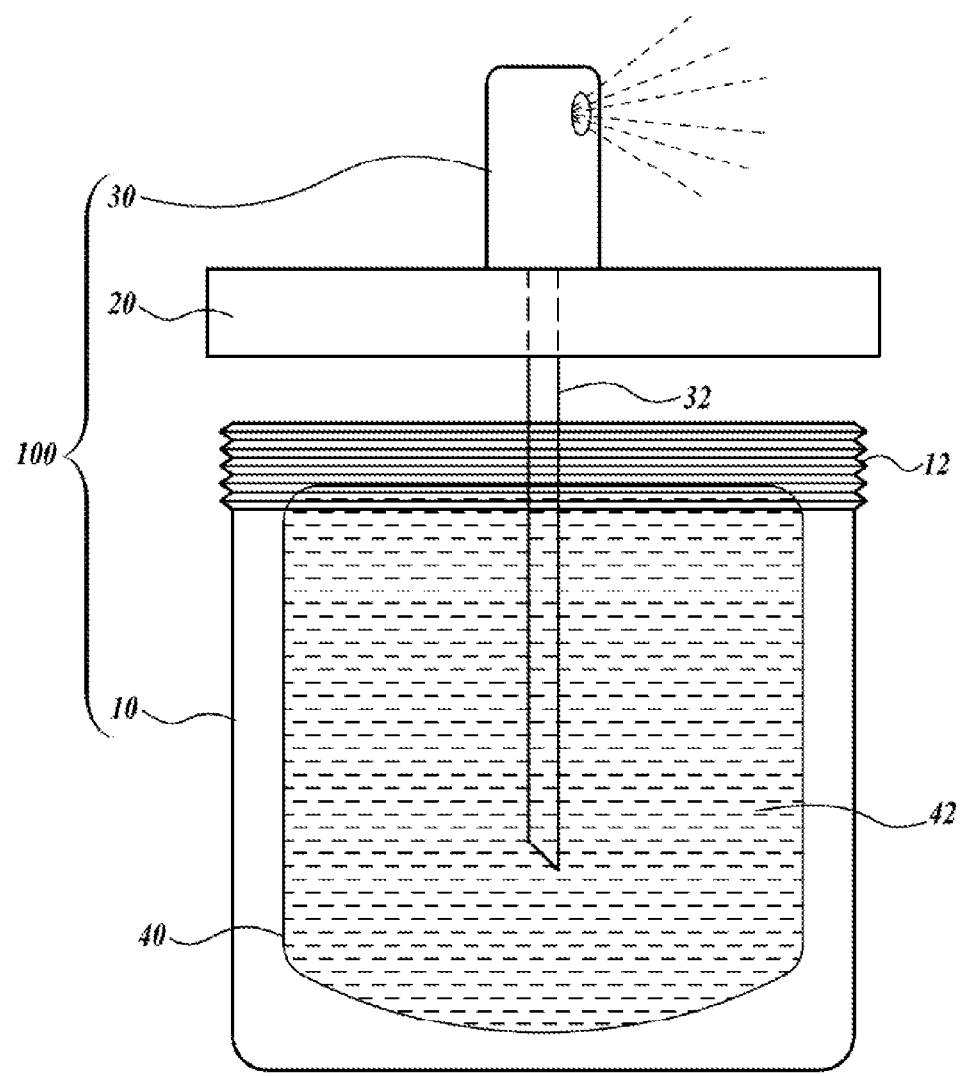
FIG. 1A is a schematic diagram of a reusable bottle in accordance with an embodiment of the present technology.

FIG. 1A is a schematic diagram of a reusable container system in accordance with one or more embodiments of the present technology. In some such embodiments, the reusable container system 100 includes a reusable bottle 10, a shoulder-located lid 20, a single-use sealed replaceable inner bag 40, an actuating expeller device 30, and a dip tube 32. In some embodiments, the reusable container 100 includes the reusable bottle 10 (e.g., a tubular bottle container) with a relatively large (e.g., larger than conventional) mouth. The reusable bottle has a bottom floor, side walls, and an opening at a top of the sidewalls of the reusable bottle 10. In one or more embodiments, the opening has a width that is approximately a same width as a width of the inside of the side walls. In other embodiments, the opening has a width that is within ten percent of a width of the inside of the side walls.

In still other embodiments, the opening has a width that is within twenty percent of a width of the inside of the side walls. In yet other embodiments, the opening has a width that is within twenty percent of a width of the inside of the side walls.

A shoulder-located lid 20 may be attached to the reusable bottle 10 through threads 12 at the top of the sidewalls. In other embodiment, the bottle 100 may take other, non-round shapes. The reusable bottle 10 is accessible to accommodate a filled single-use sealed replaceable inner bag 40 of liquid or viscous materials 42 such as water, medicine, soaps, cleaners or disinfectants. In this manner, the filled single-use sealed replaceable inner bag 40 is held within the void of the container, and the reusable container provides sufficient support to hold the filled single-use sealed replaceable inner bag without breaking. In some embodiments, a straw (also referred to as a dip tube) 32 of a sprayer 30 is placed and attached on an upper portion of the reusable bottle 10 or the shoulder-located lid 20. The dip tube 32 may be sharpened at its lower end to pierce the inner bag 40 upon assembly, thereby accessing the material for dispensing. In other embodiments, the dip tube 32 is not attached to the reusable bottle 10 or the shoulder-located lid 20 but is operatively connectable to the reusable bottle 10 or the shoulder-located lid 20 to facilitate its position to pierce the inner bag 40 upon assembly of the above components. In some embodiments, the interior bottom of the reusable bottle 10 may be formed in a concave manner allowing for enhanced dispensing of the liquid materials 42 from within the single-use sealed replaceable inner bag by maintaining an upright position of the inner bag 40 in the reusable bottle 10.

In operation, the reusable bottle 10 and lid 20 remain uncontaminated since they do not directly contact the liquid material 42 inside the single-use sealed replaceable inner bag 40, and thus, the reusable bottle 10 remains clean and reusable. A spent single-use replaceable inner bag 40 can be easily disposed of or recycled with minimal environmental impact and the reusable bottle 10 remains easily refillable with a new single-use sealed replaceable inner bag 40.

Some embodiments of the reusable container method include the following elements. In one element, the method includes inserting a single-use sealed replaceable inner bag into the reusable bottle through the opening at a top of the sidewalls. In another element, the method includes closing the lid attached to the reusable bottle at the opening at the top of the sidewalls. In still another element, the method includes piercing the single-use sealed replaceable inner bag located inside the reusable bottle with the dip tube. In yet another element, the method includes using the actuating expeller device to dispense at least a portion of the liquid material out of the single-use sealed replaceable inner bag via the dip tube. In another element, the method includes removing the single-use sealed replaceable inner bag from the reusable bottle after at least a portion of the liquid material out of the single-use sealed replaceable inner bag has been dispensed. In still another element, the method includes replacing a new single-use sealed replaceable inner bag into the reusable bottle.

Figure 1B:
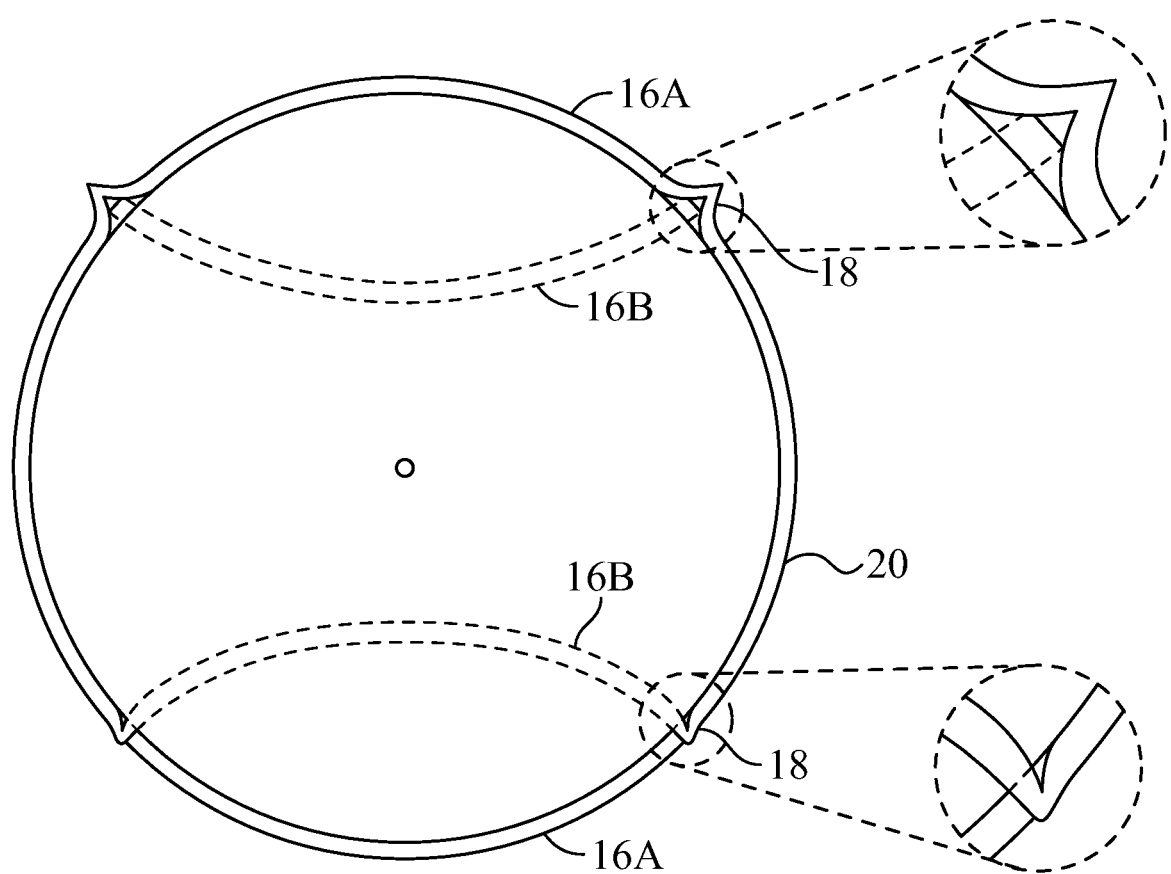
FIG. 1B is a top view of the reusable bottle shown in FIG. 1A showing panels in an unflexed position and a flexed position in accordance with an embodiment of the present technology.

FIG. 1B is a top view of the reusable bottle shown in FIG. 1A. In some such embodiments of the reusable container system 100, depending on the material, thickness, and configuration of the single-use sealed replaceable inner bag 40, as well as the properties of the liquid material 42 itself, the inner bag 40 may have difficulties maintaining an upright position as the bag 40 empties. Many difficulties may be encountered when the bag 40 fails to maintain an upright position after it has been pierced, such as difficulties in dispensing the liquid material 42 and spillage inside of the reusable bottle 10 (and potentially outside of the reusable bottle 10 as well depending on the seal of the lid 20 to the reusable bottle 10) Additionally, in some such embodiments of the reusable container system 100, the inner bag 40 may have difficulties maintaining an upright position prior to the bag 40 being pierced by the dip tube 32. If the bag does not maintain an upright position (with the pierceable section in position for puncture by the dip tube 32) then the bag 40 may be present sufficient resistance to enable a dip tube 32 to pierce its surface. Accordingly, one or more embodiments of the reusable container system 100 include structural components that enable to reusable container system 100 to hold bags of different sizes, fills and viscosities in position for puncture by the dip tube 32 for evacuation of the liquid material 42 herein.

Figure 1C:
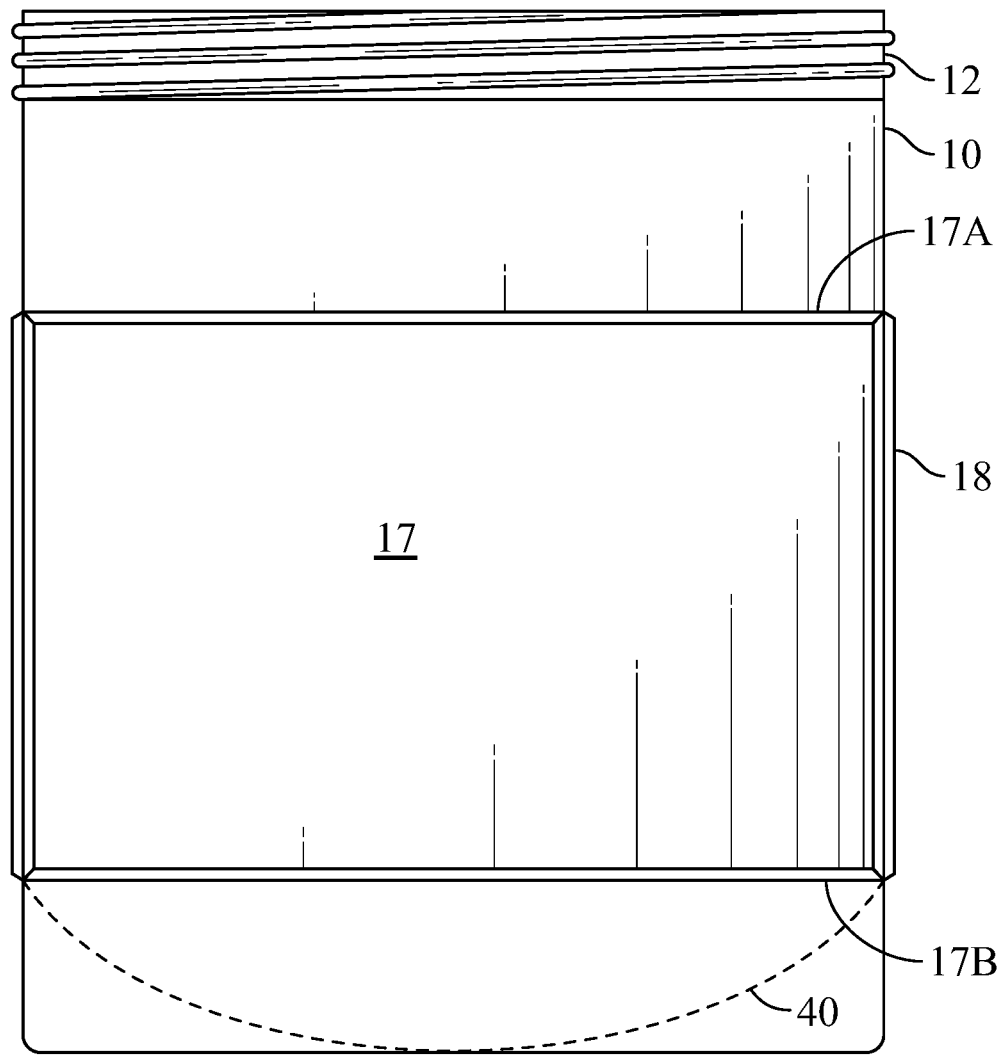
FIG. 1C is a front view of the reusable bottle shown in FIG. 1A showing a compressible face in accordance with an embodiment of the present technology.

Referring now to FIGS. 1B and 1C, the configuration of the reusable container system 100 includes panels having compressible faces 17 that oppose each other on the side walls of the reusable bottle 10. In some embodiments, the compressible faces 17 may be molded in a manner such that they are disconnected horizontally from their respective face along upper horizontal edges 17A and lower horizontal edges 17B, but connected via its vertical features with hinges 18 created along vertical side edges by molded and thin web sections. In other embodiments, the compressible faces 17 are connected horizontally to their respective face along upper horizontal edges 17A and lower horizontal edges 17B, since material is chosen of dimension and flexibility that enables the compressible faces 17 and the surrounding sections of the reusable bottle to flex sufficiently that disconnecting the horizontal edges 17A and 17B is not required.

In some embodiments, the web sections (i.e., hinges 18) act as an "over-center draw latch" allowing for the bilateral and manual compression of the panels into the void of the bottle, which in turn support the inner single-use bag vertically in position. Draw latches utilize tension to bring together the two components of the latch. Draw latches include a latch and a keeper, which are mounted on opposite sides of a closure and pull both sides together during the closing action. Over-center draw latch are designed so that the arm that latches onto the keeper extends over a pin on which the lever rotates. Over-center draw latches have keepers mounted on the same or lower plane as the latch (e.g., the hinge feature of shampoo bottles in representative of an over-center draw latch).

When the panels are not being bilaterally and manually compressed by a user into the void of the reusable bottle 10 they are shown unflexed in the position 16a, while when the panels are bilaterally and manually compressed by a user into the void of the reusable bottle 10 they are shown flexed in the position 16b.

Once the single-use sealed replaceable inner bag 40 is evacuated and the bag and shoulder-located lid 20 are removed, the panels can be pushed outward from the flexed position 16B to their unflexed position 16A across the web tensioned hinge 18 of the over center draw latch for reinsertion of the replacement bag, allowing for continued use of the reusable bottle 10 in this manner.

This structural configuration of the reusable container system 100 enables the panels to act like windows that pop into place and out of place. Significantly, by altering where the panels and hinges 18 are located on the tangent of the circumference of the reusable bottle 10, the amount of force needed to flex the panels from an unflexed position 16A to a flexed position 16B may be modified. Additionally, the distance that the panels may flex can also be changed by altering where the panels and hinges 18 are located on the tangent of the circumference of the reusable bottle 10. Accordingly, this structural configuration of the reusable container system 100 is a very scalable and adaptable depending of the desired parameters of the panels having compressible faces 17.

Figure 2:
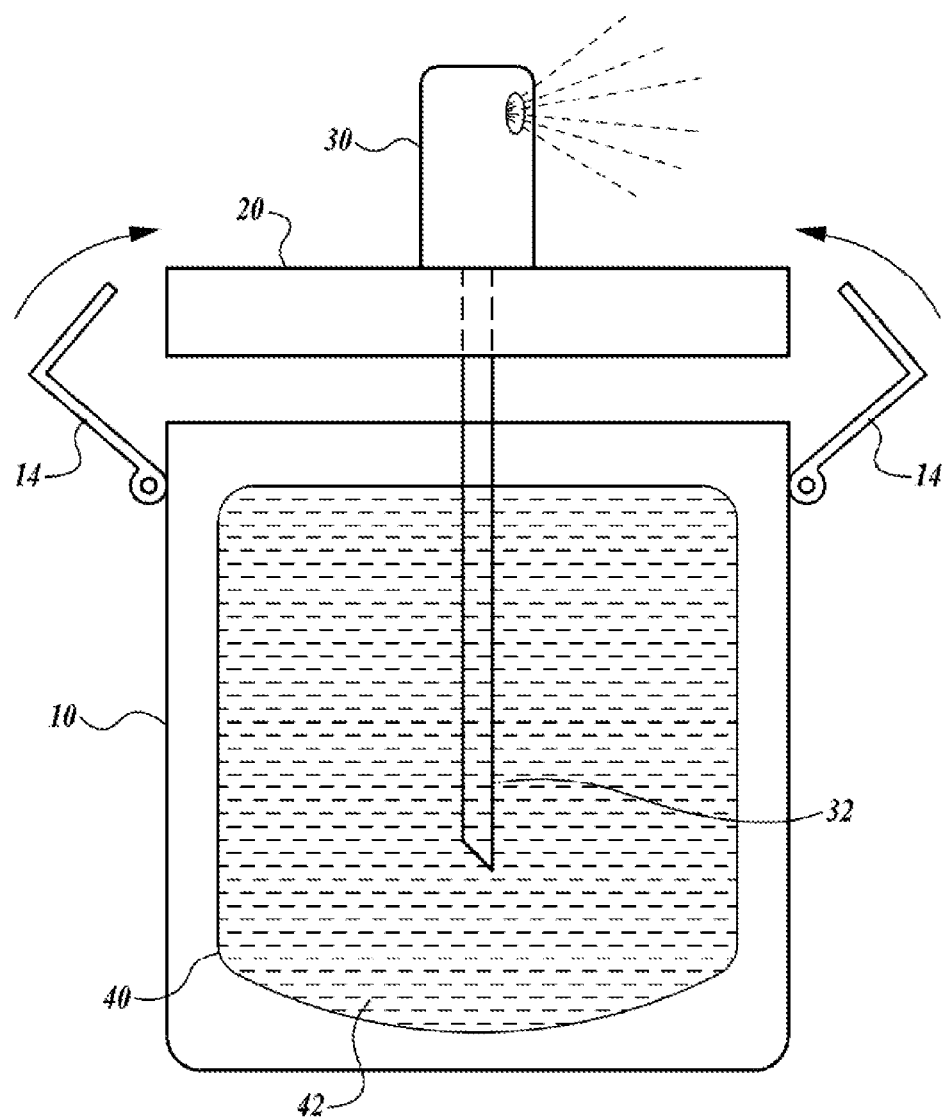
FIG. 2 is a partially schematic view of a reusable bottle with a clip-on lid in accordance with an embodiment of the present technology.

Referring now to FIG. 2, a partial schematic view of one embodiment of a reusable container system 100 is shown that includes a reusable bottle 10 and a clip-on lid. In this embodiment, the lid 20 is attached to the reusable bottle 10 with one or more hinge-mounted clips 14 (e.g., two hinge mounted clips 14 in the embodiment shown in FIG. 2). In some embodiments, the mating of a non-round reusable bottle 10 with the lid 20 may be improved with the one or more clips 14 since threading may but close properly for non-round connecting components.

Figure 3:
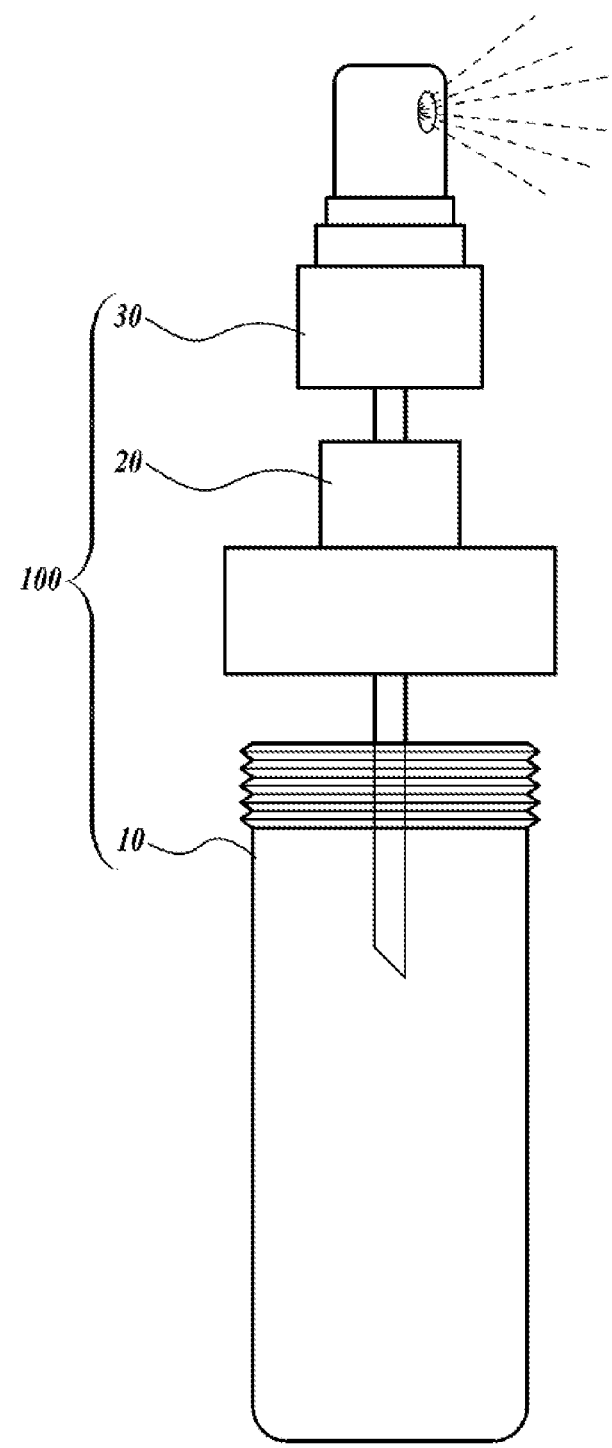
FIG. 3 is an exploded view of a reusable bottle in accordance with an embodiment of the present technology.

Referring now to FIG. 3, an exploded view of one embodiment of a reusable container system 100 is shown with a smaller reusable bottle 10. In operation, a user may use the actuating expeller device 30 to dispense the liquid material 42 onto his/her body, clothing, surfaces that require disinfection (e.g., furniture, kitchen surfaces, bathroom surfaces), and the like. By way of example only, and not by way of limitation, one nonlimiting example of such liquid material 42 that is a disinfectant, for example, HOCl. In various embodiments of the reusable container system 100, the actuating expeller device 30 may be a pump, sprayer, plunger, or pressure biasing system. In various embodiments of the reusable container system 100, the liquid material by include thinner water-like liquids or thicker liquids like viscous fluid or gel.

Figure 4:
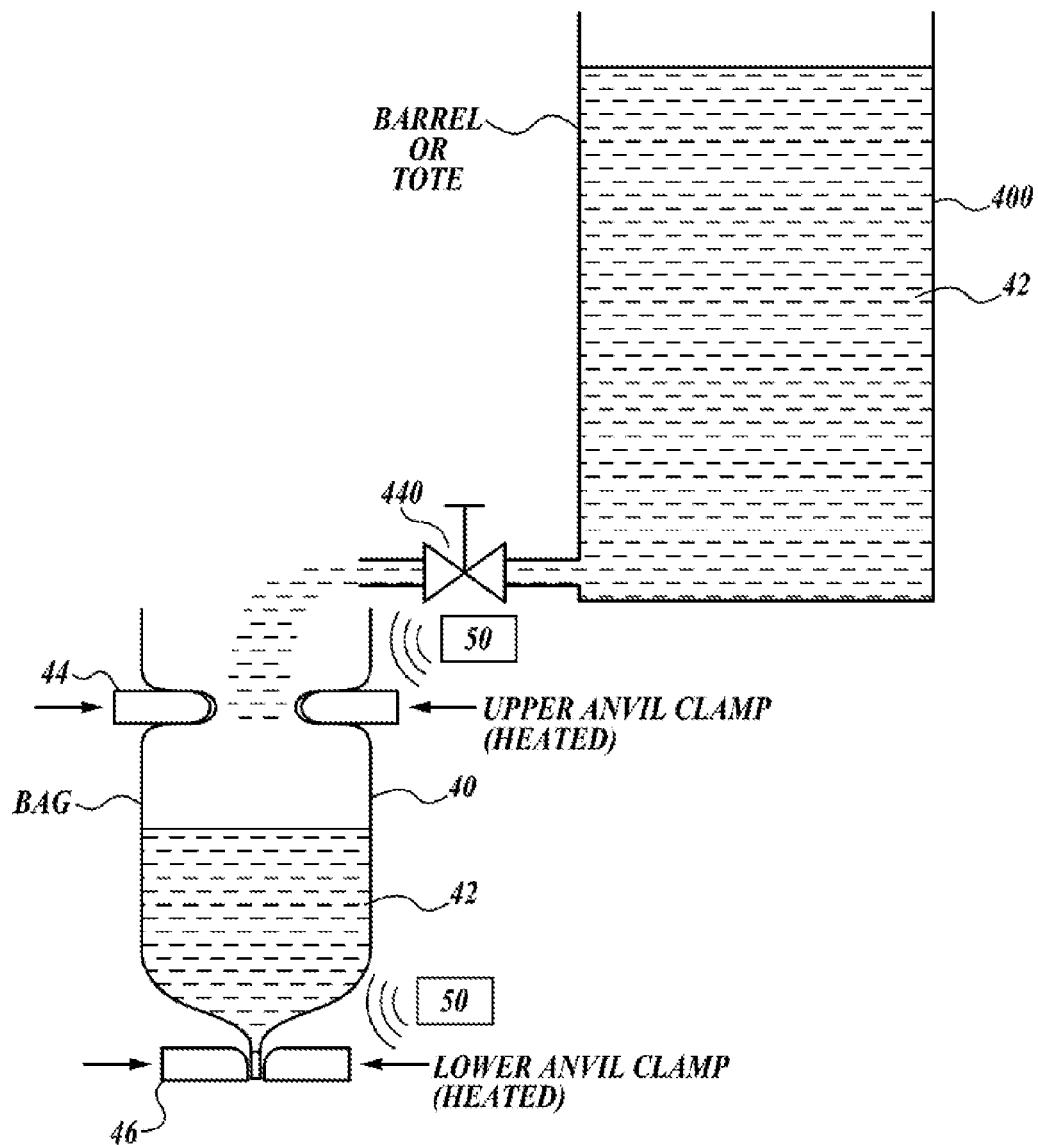
FIG. 4 is a schematic view of filling an inner bag with product in accordance with an embodiment of the present technology.

FIG. 4 is a schematic view of filling an inner bag with product in accordance with an embodiment of the present technology. The bags 40 may be made from plastic roll tubing. In different embodiments, roll tubing could be pre-printed with holograms and security imprints to verify to the end user the validity of the product serving therefore as a Quality Control measure against piracy and counterfeits.

Referring now to another embodiment, a system of plastic roll tubing material (as an example 2 mil thick material) may be placed proximally to viscous material 42 that is in a barrel or tote 400, such that gravity flow induces filling processes. In operation, the filling process can be controlled by a valve 440 (either hand valve or an automated valve) such that the tubing is presented vertically above anvil clamps 44, 46 (also referred to as an upper sealer 44 and a lower sealer 46). In some embodiments, the anvil clamps 44, 46 may be spaced apart top-to-bottom such that a prescribed volume can be dispensed. The anvil clamps 44, 46 may be sharpened and heated to produce narrow heat bands on their clamp points to cause both sealing and cutting.

In operation, the anvil clamps 46 may sequentially open and close by a manual mechanism, thereby allowing for the filling of a measured amount of liquid or viscous material 42 prior to the secondary manually indexed heat sealing of the top of the bag 40 by the anvil clamps 44. In some embodiments, the only electrical element may be a battery-fed induction heater 50 that produces heat bands of the sealing device, thus enabling wide use of the inventive technology in the off-grid areas of world. The filled inner bag drops by gravity into a receptacle below and is now ready for the consumer.

Barrels or totes 400 may be delivered relatively inexpensively in bulk or may be locally produced, thereby minimizing transport costs so that the cost of delivered package is very small outside of the actual products' material cost. A low cost set up of bulk barreled product, a dispensing tube, inexpensive roll tubing and anvil set heat sealer may enable a packaging solution at the local market at perhaps 1-2% of the per unit cost of a product in a developed country. The reusable container 100 may be afforded by an initial small fee (perhaps less than one dollar), so as to be affordable to the most challenged economies when amortized over its use cycle.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. For example, in some embodiments the counter or controller may be based on a low-power buck regulator connected to a capacitor. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The present application may also reference quantities and numbers. Unless specifically stated, such quantities and numbers are not to be considered restrictive, but exemplary of the possible quantities or numbers associated with the present application.

Also, in this regard, the present application may use the term "plurality" to reference a quantity or number. In this regard, the term "plurality" is meant to be any number that is more than one, for example, two, three, four, five, etc. The terms "about," "approximately," etc., mean plus or minus 5% of the stated value.

Certain words and phrases used in the specification are set forth as follows. As used throughout this document, including the claims, the singular form "a", "an", and "the" include plural references unless indicated otherwise. Any of the features and elements described herein may be singular, e.g., a sensor may refer to one sensor and a memory may refer to one memory. The terms "include" and "comprise," as well as derivatives thereof, mean inclusion without limitation. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this disclosure.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the present disclosure.

Generally, unless otherwise indicated, the materials for making the invention and/or its components may be selected from appropriate materials such as metal, metallic alloys (high strength alloys, high hardness alloys), composite materials, ceramics, intermetallic compounds, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described embodiments, but should be defined only in accordance with the following claims and their equivalents.

What is claimed is:

1. A reusable container system for reducing the use of plastic, the system comprising:

a reusable bottle having a bottom floor, side walls, and an opening at a top of the sidewalls, wherein the opening has a width that is approximately a same width as a width of the inside of the side walls;

a shoulder-located lid attachable to the reusable bottle at the opening at the top of the sidewalls;

a single-use sealed replaceable inner bag that holds a liquid material inside the reusable bottle, wherein the single-use sealed replaceable inner bag is pierceable by a straw;

an actuating expeller device that is operatively associated with the lid of the reusable bottle, wherein the actuating expeller device is a sprayer or a pump; and a dip tube that is not attached to the reusable bottle or the shoulder-located lid, the dip tube having a leading edge that pierces the single-use sealed replaceable inner bag upon assembly, accesses the liquid material, and dispenses the liquid material without contaminating the reusable bottle, wherein the sidewalls contain two opposing panels that flex inwardly across web tensioned hinges to support the single-use sealed replacement inner bag in a vertical position, in response to compression by a user, wherein two remaining sidewall sections connect the two opposing panels, and wherein the two opposing panels and the two remaining sidewall sections are connected to each other by the web tensioned hinges.

2. The reusable container system of claim 1, wherein the lid is attachable to the reusable bottle by threads, a hinge and one or more clips, a hinge and one or more latches, a hinge and one or more snaps, and a hinge and one or more pressure fitting components.

3. The reusable container system of claim 1, wherein the reusable bottle includes side wall sections that are attached vertically but unattached horizontally, and wherein the side wall sections may be flexed inwards on opposing sides to secure the inner bag and hold the inner bag upright.

4. The reusable container system of claim 1, wherein the bottom floor is concave in shape with a lowest point at a center of the bottom floor to facilitate consumption of contents of the inner bag.

5. The reusable container system of claim 1, wherein the inner bag is manufactured from roll-tubing that is heat-sealed.

6. The reusable container system of claim 1, wherein the inner bag is marked with a unique identifier to indicate authentication of manufacturing source.

7. The reusable container system of claim 6, wherein the unique identifier is a custom hologram.

8. The reusable container system of claim 1, wherein the liquid material is a free flowing substance with a fixed volume that includes gels and viscous materials.

9. The reusable container system of claim 1, wherein the web tensioned hinges act as over-center draw latches for bilateral compression of the panels.

10. A reusable container system, comprising:

a reusable bottle having a bottom floor, side walls, and an opening at a top of the sidewalls;

a lid attachable to the reusable bottle at the opening at the top of the sidewalls;

a single-use sealed replaceable inner bag that holds a liquid material inside the reusable bottle, wherein the single-use sealed replaceable inner bag is pierceable by a straw;

an actuating expeller device that is operatively connectable with the lid of the reusable bottle; and a dip tube that is not attached to the reusable bottle or the shoulder-located lid, the dip tube having a leading edge that pierces the single-use sealed replaceable inner bag upon assembly and accesses the liquid material, wherein the sidewalls contain two opposing panels that flex inwardly across hinges to support the single-use sealed replacement inner bag in a vertical position, in response to compression by a user.

11. The reusable container system of claim 10, wherein the lid is attachable to the reusable bottle by threads, a hinge and one or more clips, a hinge and one or more latches, a hinge and one or more snaps, and a hinge and one or more pressure fitting components.

12. The reusable container system of claim 10, wherein the reusable bottle includes side wall sections that are attached vertically but unattached horizontally, and wherein the side wall sections may be flexed inwards on opposing sides to secure the inner bag and hold the inner bag upright.

13. The reusable container system of claim 10, wherein the bottom floor is concave in shape with a lowest point at a center of the bottom floor to facilitate consumption of contents of the inner bag.

14. The reusable container system of claim 10, wherein the inner bag is manufactured from roll-tubing that is heat-sealed.

15. The reusable container system of claim 10, wherein the inner bag is marked with a unique identifier to indicate authentication of manufacturing source.

16. The reusable container system of claim 15, wherein the unique identifier is a custom hologram.

17. The reusable container system of claim 10, wherein the liquid material is a free flowing substance with a fixed volume that includes gels and viscous materials.

18. The reusable container system of claim 10, wherein the actuating expeller device is selected from one or more of a sprayer, a pump, and a plunger.

19. The reusable container system of claim 10, wherein the opening has a width that is within ten percent of the width of the inside of the side walls.

20. A reusable container method for using a reusable container system to reducing plastic waste, the system including a reusable bottle having a bottom floor, side walls, and an opening at a top of the sidewalls, a lid attachable to the reusable bottle at the opening at the top of the sidewalls, a single-use sealed replaceable inner bag that holds a liquid material inside the reusable bottle, an actuating expeller device that is operatively connectable with the lid of the reusable bottle, and a dip tube with a leading edge that pierces the single-use sealed replaceable inner bag upon assembly and accesses the liquid material, the method comprising:
  closing the lid attached to the reusable bottle at the opening at the top of the sidewalls;
  piercing the single-use sealed replaceable inner bag located inside the reusable bottle with the dip tube, wherein the dip tube is not attached to the reusable bottle or the lid;
  flexing two opposing panels in the sidewalls inwardly across web tensioned hinges to support the single-use sealed replacement inner bag in a vertical position, wherein two remaining sidewall sections connect the two opposing panels, wherein the two opposing panels and the two remaining side wall sections are connected to each other across the web tensioned hinges;
  using the actuating expeller device to dispense at least a portion of the liquid material out of the single-use sealed replaceable inner bag via the dip tube;
  removing the single-use sealed replaceable inner bag from the reusable bottle after at least a portion of the liquid material out of the single-use sealed replaceable inner bag has been dispensed;
  unflexing the two opposing panels outwardly across the web tensioned hinges for reinsertion of a replacement inner bag; and
  replacing a new single-use sealed replaceable inner bag into the reusable bottle by inserting the new single-use sealed replaceable inner bag into the reusable bottle through the opening at the top of the sidewalls.

* * * * *